United States Patent

Taki

Patent Number: 5,691,831
Date of Patent: Nov. 25, 1997

[54] OPTICAL BEAM SCANNING DEVICE WITH HOLOGRAM DISC

[75] Inventor: Kazunari Taki, Nagoya, Japan

[73] Assignee: Brother Kogyo Kabushiki Kaisha, Aichi-ken, Japan

[21] Appl. No.: 496,006

[22] Filed: Jun. 28, 1995

[30] Foreign Application Priority Data

| Jun. 29, 1994 | [JP] | Japan | 6-147443 |
| Oct. 27, 1994 | [JP] | Japan | 6-263486 |
| Nov. 18, 1994 | [JP] | Japan | 6-309569 |

[51] Int. Cl.$^6$ .................. G02B 5/32; G02B 26/08
[52] U.S. Cl. .................. 359/18; 359/17; 359/209; 235/457
[58] Field of Search ............... 359/16, 17, 18, 359/209; 235/457

[56] References Cited

U.S. PATENT DOCUMENTS

| 4,505,537 | 3/1985 | Funato | 359/18 |
| 4,647,143 | 3/1987 | Yamazaki et al. | 359/18 |
| 4,761,046 | 8/1988 | Funato | 359/18 |
| 4,794,237 | 12/1988 | Ferrante | 235/457 |
| 5,182,659 | 1/1993 | Clay et al. | 359/17 |
| 5,223,957 | 6/1993 | Itoh et al. | 359/17 |
| 5,295,004 | 3/1994 | Hasegawa et al. | 359/17 |

FOREIGN PATENT DOCUMENTS

| 59-65823 | 4/1984 | Japan | 359/18 |
| 5-134205 | 5/1993 | Japan . | |
| 5-289017 | 5/1993 | Japan . | |

OTHER PUBLICATIONS

Research Disclosure, "Holographic Scanner with Compensation for Substrate Non-Parallelism", anonymous, Feb. 1985 No. 250.

*Primary Examiner*—Paul M. Dzierzynski
*Assistant Examiner*—Darren E. Schuberg
*Attorney, Agent, or Firm*—Oliff & Berridge

[57] ABSTRACT

A laser source and a converging lens are provided so that a laser beam emitted from the converging lens travels substantially parallel to the surface of a hologram disc. A incidence mirror is provided for causing the laser beam emitted from the lens to fall incident on the hologram disc at an angle of incidence of about 45 degrees. By merely moving or rotating the incidence mirror, the position of and the angle of incidence of laser beam to the hologram disc can be easily adjusted.

17 Claims, 8 Drawing Sheets

5,691,831

OPTICAL BEAM SCANNING DEVICE WITH HOLOGRAM DISC

BACKGROUND OF THE INVENTION

1. Field of the Invention

The present invention relates to an optical beam scanning device which can be used in a laser printer and the like, and more particularly to an optical beam scanning device using a hologram disc for deflecting a laser beam.

2. Description of the Related Art

There is conventionally known an optical beam scanning device that uses a hologram disc for deflecting an optical beam to scan a photosensitive drum with the optical beam. For example, U.S. Pat. No. 5,295,004 and Japanese Patent Kokai No.5-289017 disclose this type of optical beam scanning device. A hologram disc described in these documents has an annular hologram area which is uniformly divided into a plurality of identical hologram facets. The hologram disc is mounted rotatable about its center. A laser source and a lens are provided for irradiating a laser beam onto the hologram disc, where the laser beam is diffracted by one of the hologram facets. As the hologram disc rotates about its center, the diffraction angle at which the hologram facet diffracts the incident laser beam changes so that the laser light diffracted at the hologram facet scans over the photosensitive drum in a straight line in the lengthwise direction of the photosensitive drum.

In order to increase diffraction efficiency, the angle of incidence at which the laser light falls incident on the hologram facet is set to around 45 degrees. The optical axes of the laser source and the lens are therefore positioned at about a 45 degree angle to the surface of the hologram disc. This requires the laser source and the lens be provided at the slant in regards to the hologram disc. In order to precisely adjust the angle of and the position of incidence of the laser light to the hologram disc, the laser source and the lens need to be rotated and moved simultaneously. The positioning of where the laser light falls incident upon the hologram disc is thus difficult. This structure is also difficult to produce efficiently.

SUMMARY OF THE INVENTION

The laser source and the lens thus provided at the slant in regards to the hologram disc will present another problem in providing a compact optical beam scanning device. A compact optical beam scanning device can be conceived, as shown in FIG. 1. This optical beam scanning device 100 is for linearly scanning a photosensitive drum 120 with a laser beam. The optical beam scanning device 100 includes: a semiconductor laser 101; a converging lens 102; a hologram disc 103; and reflective mirrors 104 and 105. A divergent laser beam (i.e., a divergent bundle of laser beam) emitted from the semiconductor laser 101 is converted into a collimated laser beam by the converging lens 102. The hologram disc 103 is attached to a rotation shaft of a motor 122. An annular diffraction region 112 formed on the hologram disc 103 is divided into several hologram facets. The collimated laser beam produced by the converging lens 102 falls incident on a hologram facet. The hologram facet has a hologram pattern which can diffract an incident collimated laser beam while converging the laser beam into a spot on the photosensitive drum 120. The laser beam diffracted at the hologram facet is reflected off the reflection mirrors 104 and 10S toward the photosensitive drum 120, thereby forming a laser beam spot on the photosensitive drum 120. As the hologram disc 103 rotates with the rotation drive of the motor 122, the laser beam diffracted at the hologram facet scans in a straight line in the lengthwise direction over the photosensitive drum 120. Thus, both diffraction and convergence of the laser beam are performed using the hologram disc 103.

As described already, in order to increase diffraction efficiency at which the hologram facet diffracts the laser beam, both the semiconductor laser 101 and the converging lens 102 must be provided at a slant to the hologram disc 103. Therefore, the optical beam scanning device 100 must be formed with a protrusion and cannot be formed in a thin square shape. The optical beam scanning device is therefore insufficiently compact.

It is therefore, an object of the present invention to overcome the above-described problems, and to provide an optical beam scanning device that can be built in a sufficiently thin and compact shape and that can be efficiently produced by simple assemblages of components.

In order to attain this and other objects, the present invention provides an optical beam scanning device including one rotatable hologram disc which is rotatable about a center thereof, the device comprising: a laser unit emitting a laser beam; a hologram disc rotatable about its center and having a surface for diffracting the laser beam, the hologram disc being positioned relative to the laser unit so that the laser beam emitted from the laser unit travels substantially parallel to the surface of the hologram; and incidence control means for causing the laser beam emitted from the laser unit to fall incident on the hologram disc.

According to another aspect, the present invention provides an optical beam scanning device comprising: a laser source emitting laser light; a rotatable circular hologram disc having a diameter, the hologram disc diffracting the laser light from the laser source to scan a subject medium in an in-scan direction; and an optical system disposed to irradiate the hologram disc with laser light emitted from the laser source and converging the laser light in a cross-scan direction perpendicular to the in-scan direction to converge at a focal point on the hologram disc, the optical system having a focal length longer than the diameter of the hologram disc.

According to still another aspect, the present invention provides an optical beam scanning device comprising: a laser source emitting laser light; a rotatable circular hologram disc for diffracting the laser light from the laser source; driving means for rotationally driving the circular hologram disc to change the diffraction direction, in which the hologram disc diffracts the laser light, thereby scanning a subject medium with the laser light; an optical system for directing the laser light from the laser source onto an upper surface of the hologram disc so that the laser light passes the hologram disc from the upper surface to its lower surface whereby the laser light is diffracted; and reflection means for reflecting the laser light diffracted by the hologram disc and outputted from the lower surface of the hologram disc upwardly past an outer edge of the hologram disc.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
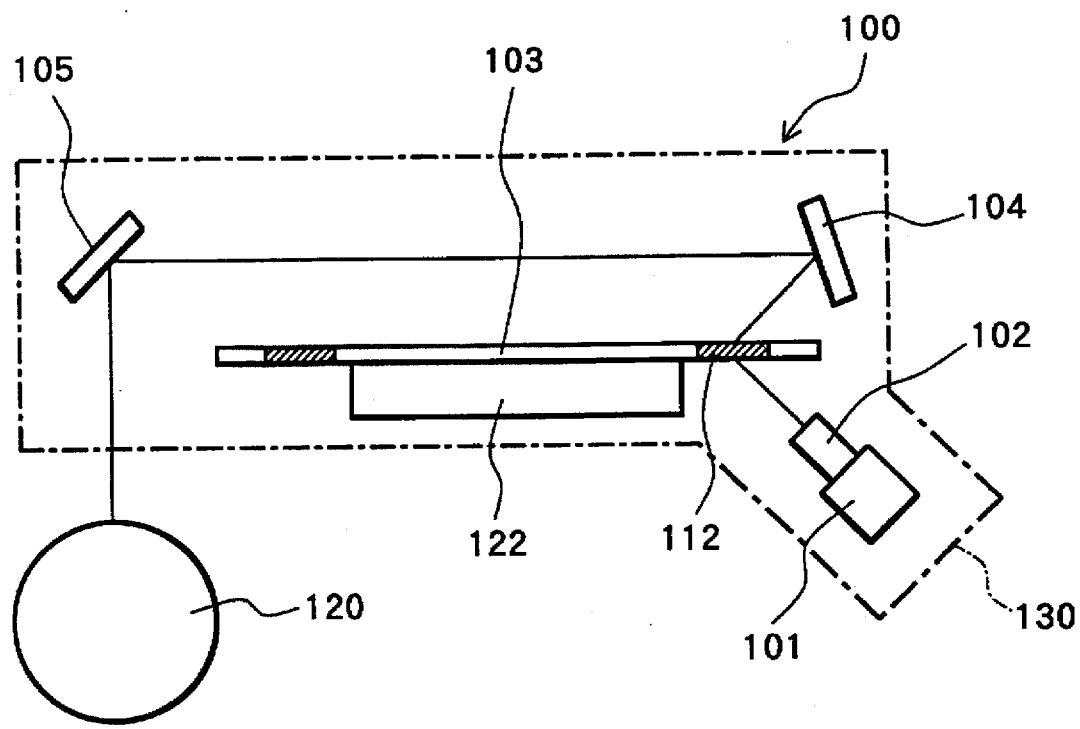
FIG. 1 is a side view showing a structure of a proposed optical beam scanning device.

An optical beam scanning device according to preferred embodiments of the present invention will be described while referring to the accompanying drawings wherein like parts and components are designated by the same reference numerals to avoid duplicating description.

Figure 2:
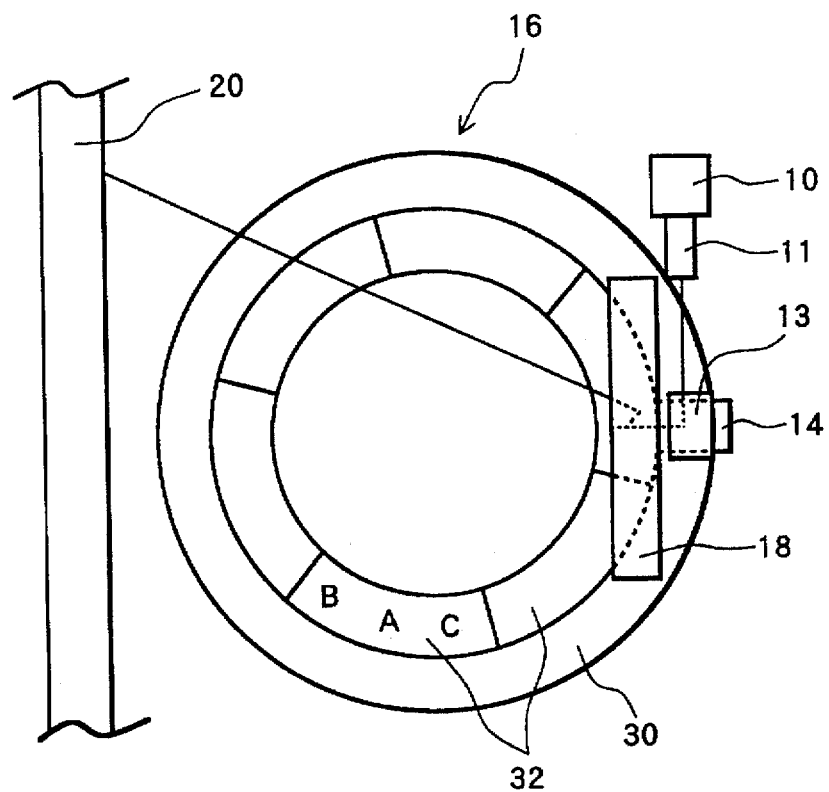
FIG. 2(a) is a plan view showing a structure of an essential part of an optical beam scanning device of a first preferred embodiment of the present invention.
FIG. 2(b) is a side view showing a structure of the optical beam scanning device of the first preferred embodiment of the present invention.
Figure 2:
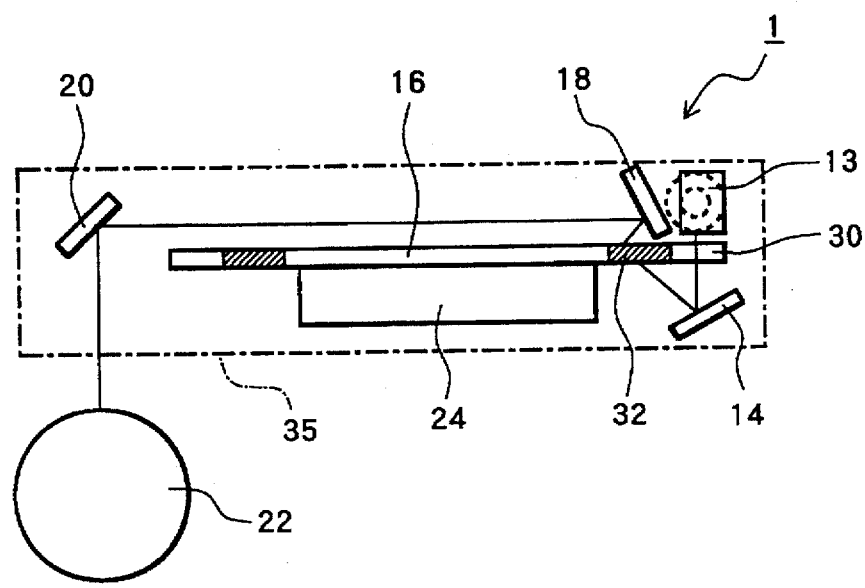

FIGS. 2(a) and 2(b) show an optical beam scanning device according to a first embodiment of the present invention. The optical beam scanning device 1 is for linearly scanning a laser beam across a photosensitive drum 22 in the lengthwise direction. The optical beam scanning device includes: a laser unit constructed from a semiconductor laser 10 and a converging lens 11; reflective mirrors 13, 14, 18 and 20; a motor 24, and a hologram disc 16, which are all encased in a case 35.

The motor 24 is disposed at the base of the case 35. The circular-shaped hologram disc 16 is attached at its center to the rotation shaft of the motor 24 so as to be rotatable with rotation drive of the motor 24.

The hologram disc 16 is constructed from a disc shaped transparent base. This transparent base is made from a resin, for example, a polycarbonate resin, PMMA, or polyimide resin. Other transparent materials such as glass or ceramic can be used instead of resin to form the base of the hologram disc 16. A plurality (six in the present embodiment) of diffraction regions, that is, hologram facets 32, are formed into a ring to the hologram disc 16. The hologram facets 32 have hologram patterns designed for diffracting an incident collimated laser beam while converging it into a beam spot on the photosensitive drum 22. In this example, the hologram patterns are formed from reliefs directly formed on one surface of the base of the hologram disc 16. The hologram disc 16 is mounted on the motor 24 with its surface formed with the reliefs facing upward. Alternatively, the hologram disc 16 may be mounted on the motor 24 with its surface formed with the reliefs facing downward.

According to the present embodiment, the hologram disc 16 further includes a transmission region 30. The transmission region 30 is of a ring shape formed at an outer peripheral side of the diffraction regions 32. The transmission region 30 is for transmitting an incident laser beam. At the transmission region 30, both of the surfaces of the hologram disc 16 are made sufficiently smooth to transmit laser light.

The semiconductor laser 10 and the converging lens 11 constituting the laser unit are disposed above the hologram disc 16 so that their optical axes are parallel with the surface of the hologram disc 16. The converging lens 11 is disposed at the emission port of the semiconductor laser 10 for converting a divergent laser beam emitted from the semiconductor laser 10 into a collimated laser beam.

The reflection mirror 13 is disposed above the transmission region 30 of the hologram disc 16 in the optical axis of the converging lens 11. The reflection mirror 13 is for reflecting the laser beam, outputted from the converging lens 11, 90 degrees toward the transmission region 30, through which the laser beam passes.

The incident mirror 14 is disposed below the transmission region 30 in the optical axis of the laser light transmitted through the transmission region 30. The incident mirror 14 is for reflecting laser light from the transmission region 30 and toward the diffraction region 32. The laser beam passes through the diffraction region 32 where it is diffracted.

A pair of reflection mirrors 18 and 20 are disposed above the hologram disc 16. The reflection mirror 18, more specifically, is disposed above the diffraction region 32. The reflection mirror 18 is for reflecting the laser beam, that is diffracted at the diffraction region 32, toward the reflection mirror 20. The reflection mirror 20 is disposed above the photosensitive drum 22 for reflecting the diffracted laser beam from the reflection mirror 18 toward the surface of the photosensitive drum 22.

In the optical beam scanning device with the above-described configuration, as shown in FIG. 2(a), a divergent laser beam emitted from the semiconductor laser 10 is converted into substantially a collimated beam at the converging lens 11. The collimated laser beam is then reflected off the reflection mirror 13 90 degrees downward, as viewed in FIG. 2(b). The laser beam falls incident on the transmission region 30 of the hologram disc 16 normal to the surface of the transmission region 30. The laser beam passes the transmission region 30 and reaches the incident mirror 14. The laser beam is then reflected off the incidence mirror 14, and falls incident on the diffraction region 32 at a predetermined angle of incidence. In this example, the predetermined angle of incidence is about 45 degrees. Preferably, the angle of incidence is in the range of 45 to 50 degrees. The laser beam passes through the diffraction region 32 where the laser beam is diffracted. The laser beam then reflects off the reflection mirrors 18 and 20 toward the surface of the photosensitive drum 22. Because the diffraction region 32 not only serves to diffract the incident laser beam but also to converge the laser beam onto the photosensitive drum surface, the laser beam is converged into a beam spot on the surface of the photosensitive drum 22. As the hologram disc 16 rotates by rotation drive of the motor 24, the diffraction angle, at which the hologram facet 32 diffracts the incident laser beam, changes. The laser light spot is therefore scanned across the surface of the photosensitive drum 22 in straight lines in the lengthwise direction of the photosensitive drum 22. It is noted that the photosensitive drum 22 is scanned by one scanning line by one hologram facet.

According to this configuration, because the semiconductor laser 10 and the converging lens 11 are positioned with their optical axes parallel to the surface of the hologram disc 16, the case 35 can be built in a thin square shape without any downward slanting protrusion, as indicated in FIG. 2(b) by a single dot chain line.

Figure 3:
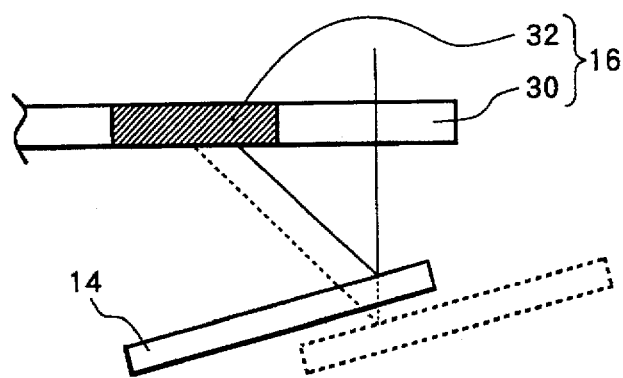
FIG. 3(a) illustrates how to move an incidence mirror 14 to control a position on which a laser beam is incident to the diffraction region 32 of the hologram disc 16.
FIG. 3(b) illustrates how to change an angle of tilt of the incidence mirror 14 to control an angle of incidence of the laser beam to the diffraction region 32.
Figure 3:
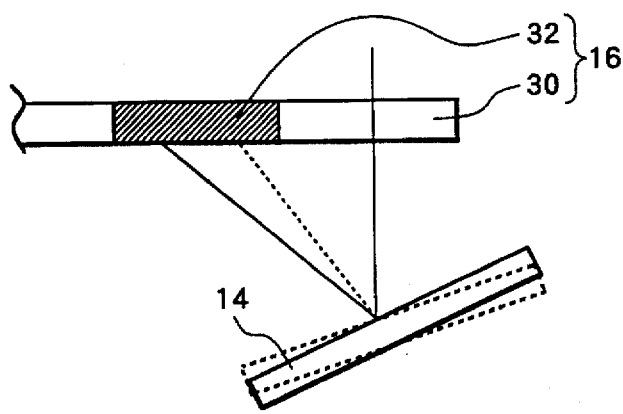

With the above-described configuration, by merely moving the incidence mirror 14 horizontally, i.e., parallel to the surface of the hologram disc 16, as viewed in FIG. 3(a), it is possible to adjust the position on which a laser beam is incident to the diffraction region 32. By merely changing the angle of tilt of the incident mirror 14 as shown in FIG. 3(b), it is possible to adjust the angle of incidence of the laser beam to the diffraction region 32. In this way, position at which the laser beam falls incident on the hologram disc 16 and the angle of incidence can be easily adjusted by adjusting the incidence mirror 14 only, thereby eliminating the need to move the semiconductor laser 10 and the converging lens 11. This construction facilitates adjustment of position of incidence and angle of incidence to the hologram disc 16.

Figure 4:
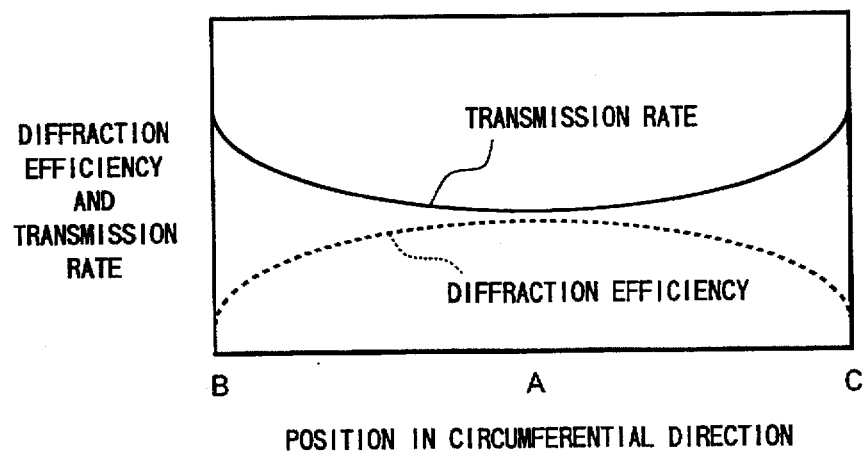
FIG. 4 is a graph showing how a transmission rate (transmission efficiency) of a transmission region 30 and a diffraction rate (diffraction efficiency) of the diffraction region 32 gradually change.

Generally, the diffraction efficiency, at which each of the hologram facets (diffraction regions) 32 diffracts light, is not constant but gradually varies as shown by the broken line in FIG. 4. The diffraction efficiency is highest at the center portion A of the facet and is lowest at edge portions B and C of the facet, where the portions A, B and C being provided circumferentially in a hologram facet 32 as shown in FIG. 2(a). When producing each hologram facet 32, two laser beams are simultaneously irradiated on a base of the hologram disc 16, whereby an interference pattern of the two laser light rays are recorded as a hologram facet in the form of a relief. Each of the two laser beams has intensity distributed in Gaussian form, and therefore has high intensity at its center and low intensity at its edge portions. The recorded interference pattern has therefore a high contrast at its center A and a low contrast at its edges B and C. The relief formed in correspondence with the interference pattern is deep at the center A and shallow at the edges B and C. The center A formed from the deep relief portion diffracts a laser beam with high diffraction efficiency, while the edges B and C formed from the shallow relief portions diffract a laser beam with low diffraction efficiency.

If a fixed amount of laser beam is continuously irradiated on the hologram facet having the above-described structure, exposure output on the photosensitive drum 22 will be largest when the laser beam is diffracted at the center portion A and smaller when diffracted at the edge portions B and C of the facet. Because the photosensitive drum 22 is scanned once by one hologram facet, the exposure output on the scan line will be largest at the center region and will be lowest at the edge regions in the lengthwise direction of the photosensitive drum 22. In order to eliminate this fluctuation in the exposure output, according to the present embodiment, the transmission rate (transmittance) of the transmission region 30 is adjusted to vary gradually as shown by the solid line in FIG. 4. That is, the transmission rate is adjusted to be lowest at the portions thereof corresponding to the center portions A of the hologram facets 32 and highest at the portions thereof corresponding to the edge portions B and C of the facets. The distribution in the transmission rate of the transmission region 30 eliminates fluctuations in the diffraction efficiency of the hologram facet 32, so that each scan across the surface of the photosensitive drum 22 obtains a fixed exposure output.

In order to gradually change the transmission rate of the transmission region 30, a thin metallic film is formed to the transmission region 30 with a gradually changing thickness. However, there are no particular restrictions to the method of changing the transmission rate of the transmission region 30. For example, light-absorbing color pigment can be coated to the transmission region 30.

Figure 5:
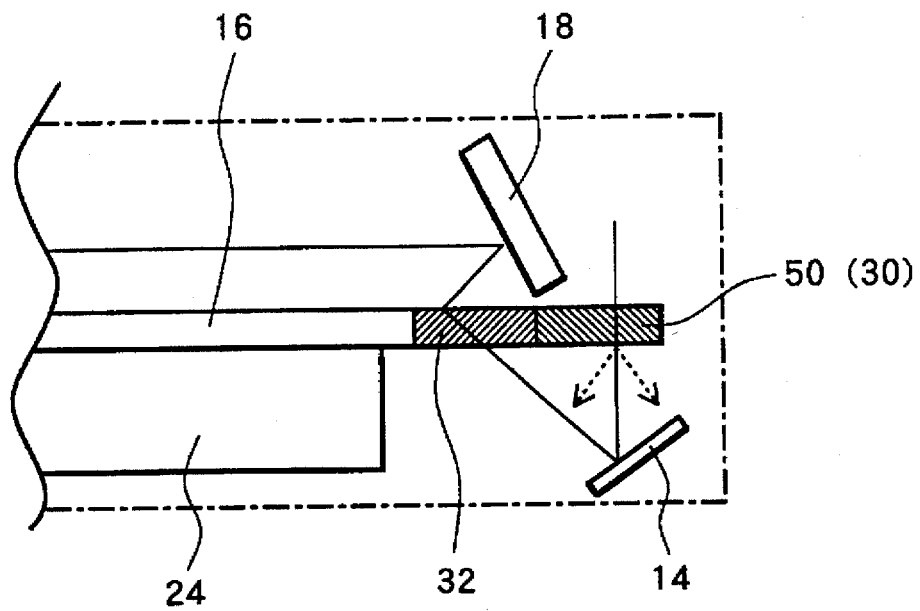
FIG. 5 is a side view showing a modification of the first embodiment.

Alternatively, as shown in FIG. 5, a hologram pattern 50 which is the same as or different from the hologram pattern of the hologram facets 32 can be formed in the transmission region 30. A diffraction grating could be formed on the transmission region 30 instead of the hologram 50. Preferably, the diffraction grating or the hologram 50 shows fluctuations in the diffraction efficiency the same as the fluctuations in the diffraction efficiency shown by the hologram facets 32 and indicated by broken line of FIG. 4. Therefore, portions of the transmission region 30 that correspond to the center portions A of the hologram facets 32 diffract a laser beam with high diffraction efficiency. These center-corresponding portions produce primary (first-ordered) and higher-ordered diffraction beams of high intensity, while producing a zero-ordered diffraction beam of low intensity. Contrarily, portions of the transmission region 30 that corresponds to the edges B and C of the hologram facets 32 diffract a laser beam with low diffraction efficiency. These edge-corresponding portions produce primary (first-ordered) and high-ordered diffraction beams of low intensity, but produces a zero-ordered diffraction beam of high intensity.

As shown in FIG. 5, when the laser beam from the reflection mirror 13 is irradiated on the hologram or the diffraction grating formed on the transmission region 30, a zero-ordered diffraction beam vertically emits from the transmission region 30 as illustrated by the solid line, and first- and high- ordered diffraction beams emit in slanted directions as illustrated by the broken lines. Only the zero-ordered diffraction beam is incident on the incident mirror 14 which is disposed directly below the transmission region 30.

The zero-ordered diffraction beam reflects off the incident mirror 14 toward the diffraction region 32. Receiving that beam, the diffraction region 32 produces a zero-ordered diffraction beam and first- and high- ordered diffraction beams. The reflection mirror 18 is disposed at a position that can receive only a first-ordered diffraction beam produced at the diffraction region 32. The first-ordered diffraction beam is guided by the reflection mirror 18 and then by the reflection mirror 20 to be scanned on the photosensitive medium 22. Thus, fluctuations in intensity of the first-ordered diffraction beam produced by the diffraction region 32 can be canceled out by changes in intensity of the zero-ordered diffraction beam produced at the diffraction grating, or the hologram 50, provided at the transmission region 30.

It is noted that the reflection mirror 13 unnecessarily introduces the laser beam to the hologram 50 or the diffraction grating at an angle of incidence normal to the surface of the hologram or the diffraction grating. The same results can be obtained by introducing the laser light to the hologram or the diffraction grating at an angle of incidence nearly normal to the surface of the hologram or the diffraction grating.

Various modifications can be provided to the optical beam scanning device of the present embodiment.

Figure 6:
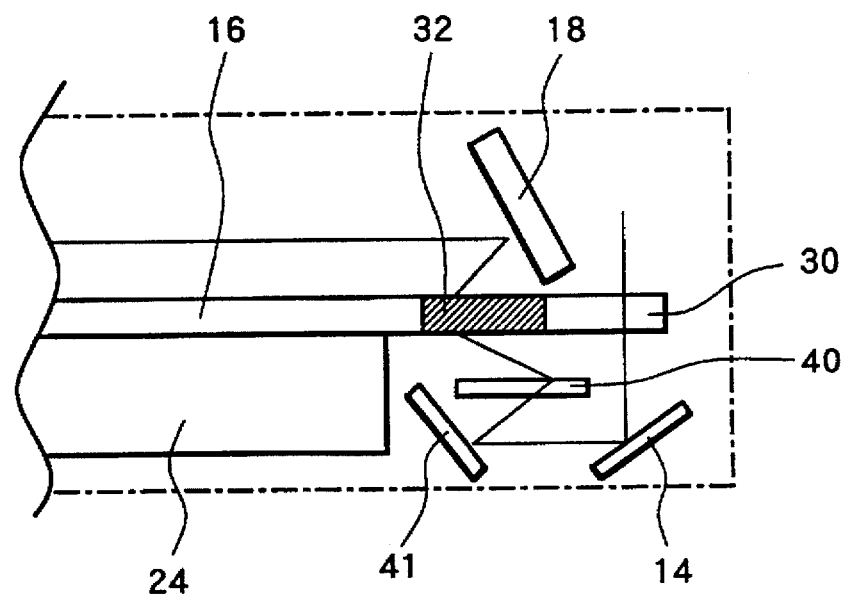
FIG. 6 is a side view showing another modification of the first embodiment.

A corrective hologram can be additionally provided either before or after the hologram disc 16 for correcting for some fluctuations caused by the hologram disc. For example, as shown in FIG. 6, an aberration correction hologram 40 can be provided before the hologram disc 16. Generally, the hologram pattern of the hologram facet 32 is produced using laser beams (recording beams) with wavelength shorter than the wavelength of the laser beam (reproduction beam) used for the scanning operation. Due to this wavelength difference, the diffraction angle, at which the hologram facet diffracts the reproduction laser light, deviates from a desired diffraction angle at which the hologram facet has been originally produced to diffract the recording laser light. Accordingly, the hologram facet fails to deflect the reproduction laser beam in its desired direction. This phenomenon is called Aberration. The aberration increases the spot diameter of the laser beam formed on the surface of the photosensitive drum 22. Correction of the aberration is necessary to realize an image with high resolution.

This aberration can be corrected by the aberration correction hologram 40 provided directly before the hologram disc, for example, as shown in FIG. 6. In order to cancel the deviation in the diffraction angle presented by the hologram facet 32 and correct for the aberration, the aberration correction hologram 40 is designed to diffract a laser beam in a direction opposite to the direction in which the hologram facet 32 diffracts the laser beam. Accordingly, a direction correction mirror 41 is additionally provided before the aberration correction hologram 40 and after the incidence mirror 14 in terms of the optical path followed by the laser beam. In this way, by using the aberration correction hologram 40, increase of the diameter of the laser spot formed on the surface of the photosensitive drum 22 can be prevented and a high resolution image can be realized. It is noted that also in this case, adjustment of the position of incidence can be performed through simply adjusting the incidence mirror 14.

Other various holograms, such as a hologram with fθ lens function and a hologram for correcting fluctuations in wavelength of the semiconductor laser 10, can be additionally provided after the hologram disc 16.

Figure 7:
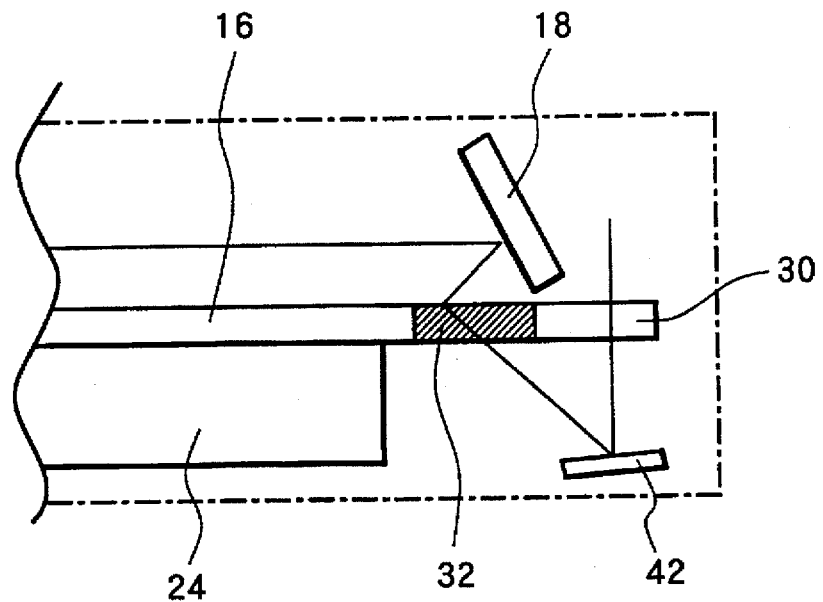
FIG. 7 is a side view showing still another modification of the first embodiment.

Instead of the incidence mirror 14, a reflection type hologram 42 can be used as shown in FIG. 7 for receiving a laser beam from the transmission region 30 and for diffracting the laser beam when reflecting off the laser beam. A first-ordered diffraction beam produced through diffraction by the hologram 42 travels to the hologram facet 32. This reflection type hologram 42 can serve as both the incidence mirror 14 and the aberration correction hologram 40. That is, the single reflection type hologram 42 can both adjust position of incidence and correct aberration.

Figure 8:
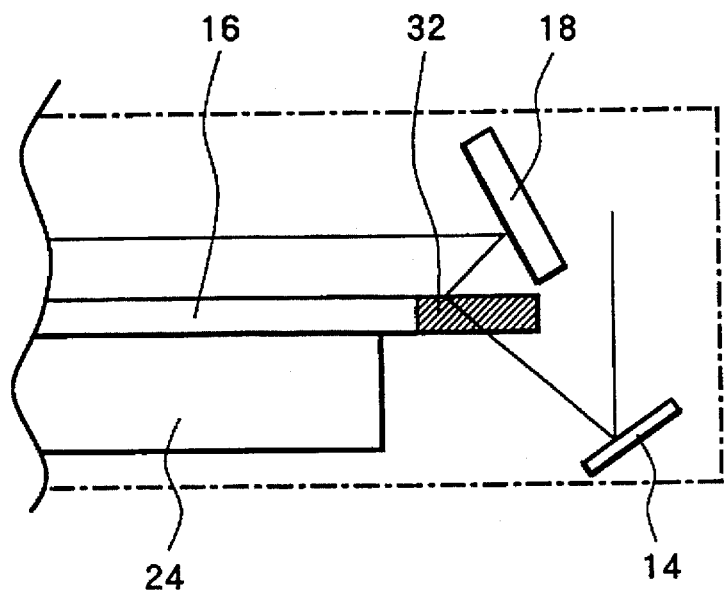
FIG. 8 is a side view showing another modification of the first embodiment.

Various modifications can be provided to the hologram disc 16 of the present embodiment. There are no particular restrictions to the construction and number of hologram facets 32. The transmission region 30 could be omitted from the hologram disc 16, as shown in FIG. 8.

The optical beam scanning device of the present embodiment can employ not only the above-described hologram disc 16 of the present embodiment but also conventional various types of hologram discs. A typical conventional hologram disc has an outer annular region at the periphery of the hologram facets. In some conventional hologram discs, this region can transmit laser beams. This region can therefore be used as the transmission region 30 for transmitting the laser beam from the reflection mirror 13 to guide it to the incidence mirror 14. In other hologram discs, this region cannot transmit laser beams. In this case, the laser beam from the reflection mirror 13 is guided past the edge of the hologram disc 16 directly to the incidence mirror 14 without being transmitted through any part of the hologram disc. This situation is the same as shown in FIG. 8. Totally moving the semiconductor laser 10, the converging lens 11, the reflection mirror 13 and the incidence mirror 14 in a horizontal direction, i.e., parallel to the surface of the hologram disc can properly position the optical axis of the laser light from the mirror 13 to pass or not to pass the outer annular region of the hologram disc.

The converging lens 11 need not be disposed so that its optical axis is completely parallel with the surface of the hologram disc 16. Disposing the converging lens 11 so that its optical axis is substantially parallel to the surface of the hologram disc 16 allows building the case 35 into a thinner shape.

In FIG. 2(a), the converging lens 11 is shown disposed so that its optical axis is tangential to the hologram disc 16. However, the optical axis of the converging lens 11 need not be tangential to the hologram disc 16. As long as the optical axis of the converging lens 11 is substantially parallel to the surface of the hologram disc 16, the case 35 can be build in a thin shape. For example, the converging lens 11 could be disposed so that its optical axis extends in a radial direction of the hologram disc 16.

Above, the hologram facets 32 are described as being designed not only to diffract laser light but also to converge the laser light onto the surface of the photosensitive medium 22. However, the hologram facets may be designed only to diffract laser light. When using a hologram disc having hologram facets with only the diffraction function, the converging lens 11 should be designed to convert the divergent laser beam from the laser source 10 into a convergent laser beam to be focused on the photosensitive drum surface.

As described above, according to the present embodiment, the laser unit, constructed from the laser source 10 and the converging lens 11, is disposed so that the optical axis of the laser light emitted therefrom is parallel with the surface of the hologram disc. Accordingly, the laser source and the converging lens constituting the laser unit can be positioned parallel with the surface of the hologram disc, thereby allowing building the case of the optical beam scanning device in a thin shape without a downward slanting protrusion. The optical beam scanning device according to the present embodiment has a case with a simpler configuration so that the case is easier to build. The incidence mirror 14 is provided to the optical beam scanning device. The incidence mirror 14 serves as an incidence control device for adjusting angle and position at which laser light is incident on the hologram disc. Accordingly, the angle of incidence and the position of incidence can be easily adjusted without moving the laser source 10 or the converging lens 11.

The hologram disc has a diffraction region and a transmission region which have a diffraction efficiency and a transmission efficiency that change gradually in correspondence with each other. Because the laser light is caused to fall incident on the diffraction region after passing through the transmission region, fluctuations in output for exposing the photosensitive medium caused by fluctuations in the diffraction rate of the diffraction region can be corrected by changing the transmission rate of the transmission region. This allows maintaining a constant exposure at the surface of the photosensitive medium.

By using a reflection type hologram in place of the incidence mirror 14, aberrations can be corrected at the same time as incidence is controlled.

Next, an optical beam scanning device according to a second embodiment of the present invention will be described with reference to FIGS. 9 through 15.

Figure 9:
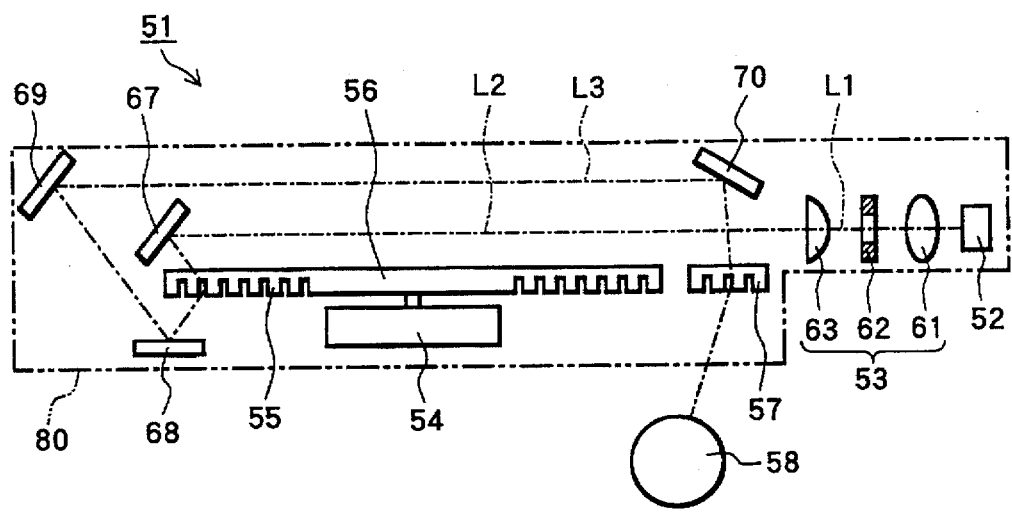
FIG. 9 is a side view showing a structure of an optical beam scanning device of a second preferred embodiment of the present invention.

FIG. 9 shows an optical beam scanning device 51 according to the second embodiment. The optical beam scanning device 51 is for scanning a photosensitive drum 58 with laser beam. The optical scanning device 51 includes: a semiconductor laser 52; an optical system 53; a motor 54; a hologram disc 55; reflective mirrors 67, 68, 69, and 70; and a hologram lens 57, which are all encased in a case 80.

The motor 54 is mounted on the base of the case 80. The hologram disc 55 is rotatably mounted, at its center, on a rotational shaft of the motor 54. The hologram disc 56 used in this embodiment is formed with several hologram facets 55, similarly to the hologram disc 16 of the first embodiment. It is noted that the hologram facets 55 of the second embodiment are designed only to diffract laser light but not to converge the laser light. The hologram facets 55 are constructed from reliefs formed directly on the base of the hologram disc 56, similarly to in the first embodiment. According to the present embodiment, the hologram disc 56 is typically mounted on the motor 54 with its surface formed with the hologram facets 55 facing downwardly, as shown in FIG. 9.

The optical system 53 is provided at the emission port of the semiconductor laser 52. The optical system 53 includes: a collimator lens 61 for converting a divergent beam of laser light emitted from the semiconductor laser 52 into a collimated beam; a slit or hole 62 through which a portion of the collimated beam from the collimator lens 61 are transmitted; and a cylindrical lens 63 for converging laser light transmitted through the slit 62 only in a direction radial to the hologram disc 56, that is, in a cross-scan direction. More specifically, the cylindrical lens 63 serves to convert a collimated beam L1 from the slit 62 into a convergent incident beam L2 converged only in the cross-scan direction on the hologram facet 55. The cylindrical lens 63 has a focal length longer than a diameter of the hologram disc 56. The cylindrical lens 63 has no converging power in a tangential direction of the hologram disc 56, i.e., in an in-scan direction. Therefore, the incident beam L2 is not convergent but parallel in the in-scan direction.

As shown in FIG. 9, the optical system 53 is disposed at a right side of the hologram disc 56 mounted on the motor 54. The optical axis of the incident beam L2 emitted from the optical system 53 extends above and parallel to the upper surface of the hologram disc 56. The optical axis extends above the center of the hologram disc 55 parallel to the diameter of the hologram disc 56 in a leftward direction of FIG. 9. The reflection mirror 67 is disposed at the optical axis of the incident laser beam L2 but at the left side of the hologram disc 56. The reflection mirror 67 is therefore located at the opposite side of the optical system 53 relative to the center of the hologram disc 56.

With this configuration, the laser beam is incident to the hologram disc 56 at a position opposite the center of the hologram disc 56 from the position of the optical system 53. The reflection mirror 67 is disposed so that the incident laser light L2 is reflected toward the hologram disc 56 at a predetermined angle, for example, 45 degrees to improve efficiency of diffraction.

The cylindrical lens 63 and the reflection mirror 67 are positioned so that the incident laser beam L2 emitted from the cylindrical lens 63 travels a distance equal to the focal length of the cylindrical lens 63 before falling incident on the hologram disc 56. Thus, the incident beam L2 can be properly converged on the hologram facet 55 in the cross-scan direction of the hologram disc 56. The cylindrical lens 63 serves to make the hologram disc 56 and the photosensitive drum 58 as conjugate with regard to the cross-scan direction, thereby correcting for the wobble rotation of the hologram disc and deviations in the diffraction angle of the hologram disc 56 which will be possibly occurred due to fluctuations in the wavelength of the semiconductor laser 52.

When diffracted by the hologram facet 55, the incident laser beam L2 is converted into a diffracted laser beam L3. Because the incident laser beam L2 is convergent in the cross-scan direction onto the hologram facet but collimated in the in-scan direction, the diffracted laser beam L3 is divergent in the cross-scan direction but is still collimated in the in-scan direction.

The reflection mirrors 68, 69, and 70 are disposed to guide the diffracted laser beam L3 from the hologram disc 56 to the hologram lens 57. Generally, the reflection rate, at which each of the reflection mirrors 68, 69 and 70 reflects the laser beam L3, is constant across its corresponding surface. However, the reflection rate of the mirror 68 can be designed to vary in a similar manner to the transmission rate of the transmission region 30 of the first embodiment shown in FIG. 5. That is, the reflection rate may be low at its center and may be high at its edge portions along the tangential direction of the hologram disc 56. Thus changed reflection rate can negate the fluctuations in the diffraction efficiency of the hologram facet 55.

The hologram lens 57 acts as a rear hologram for converging the diffracted laser light L3 into a beam spot on the photosensitive drum 58. More specifically, the hologram lens 57 presents different converging powers in the in-scan and cross-scan directions so as to properly converge the diffracted laser beam L3 into a small beam spot on the surface of the photosensitive drum 58. The hologram lens 57 is constructed from a relief formed on a surface of a base plate.

As the motor 54 rotates the hologram disc 56, the direction at which the hologram facet 55 diffracts the laser beam L3 changes in the in-scan direction (i.e., along the tangential direction of the hologram disc 56), whereby the diffracted laser beam L3 is linearly scanned across the surface of the photosensitive drum 58 in the lengthwise direction of the photosensitive drum 58 that extends parallel to the tangential direction of the hologram disc.

The hologram lens 57 also has fθ lens function for scanning the laser beam L3 at a constant speed and a deviation correction function for correcting for fluctuations in a diffraction angle of the hologram facet 55 which will be possibly occurred due to the wavelength deviation of the semiconductor laser 52.

With the above-described configuration of the optical beam scanning device 51 of the present embodiment, the cylindrical lens 63 has a focal length longer than the diameter of the hologram disc 56. A position at which the incident laser light L2 falls incident on the hologram disc 56 is located at the opposite side of the optical system 53 in regards to the center of the hologram disc 56. Therefore, the optical axis from the optical system 53 to the hologram disc 56 can be located extending close to the hologram disc 56 and parallel to the diameter of the hologram disc 56.

Accordingly, although the optical path from the optical system 53 to the hologram disc 56 is long, there is no need to provide any additional space for positioning the optical axis. This saves space so that the optical beam scanning device can be built in a small and compact shape. Also, because the semiconductor laser 52, the collimator lens 61, the slit 62, and cylindrical lens 63 are positioned so that their optical axes are parallel to the surface of the hologram disc 56, the case 80 encasing the optical beam scanning device can be formed in a slim box shape as shown by the two dot chain line in FIG. 9. There is no need to form the case with a downward slanting protrusion.

The reflection mirror 68 provided to the base wall of the case 80 at a position below the hologram disc 56 is designed to reflect the laser beam L2 upward. Accordingly, with exception of this reflection mirror 68, all optical components can be positioned above the hologram disc 56. Therefore, attachment and assemblage of optical components is simple so that the optical scanning device is easy to produce.

By its light converging action, the hologram lens 57 can be used to compensate for fluctuations in diffraction angle accompanying deviations in the optical system, wobble rotation of the hologram disc 56, and fluctuations in the wavelength of the semiconductor laser 52.

The cylindrical lens 63 with a long focal length can effectively use incident light L1 for scanning operations. That is, the long distance provided between the cylindrical lens 63 and its focal point on the hologram disc 56 makes effective uses of incident light for scanning operations, as will be described below.

Figure 10:
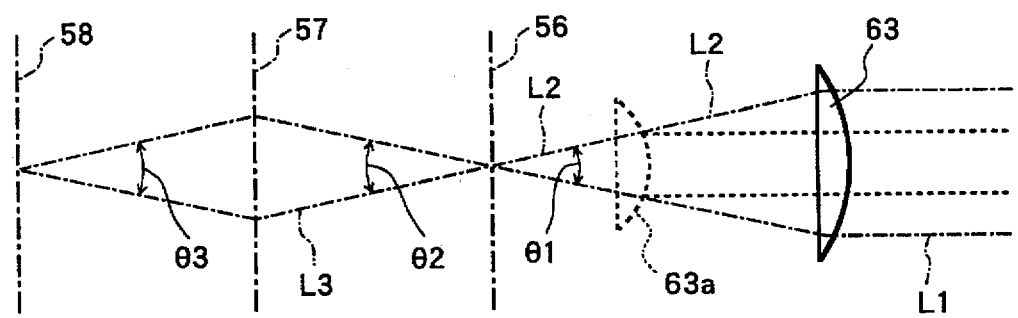
FIG. 10 illustrates how a beam diameter of a laser beam changes in a cross-scan direction at components in the optical beam scanning device of the second embodiment.

FIG. 10 schematically shows how the bundle of light rays changes, in the cross-scan direction at components of the optical beam scanning device 51. The collimated beam L1 from the collimator lens 61 is converted by the cylindrical lens 63 into the convergent beam L2 to be converged onto the hologram disc 56 at a convergent angle θ1 in the cross-scan direction. The convergent beam L2 irradiates the hologram disc 56 where it is converted into the divergent beam L3 divergent with a divergent angle θ2. This divergent beam L3 then falls incident on the hologram lens 57 where it is again converted into a convergent beam converged with a convergent angle θ3 to form a small beam spot on the surface of the photosensitive drum 58.

The diameter or spot size d of the beam spot formed on the surface of the photosensitive drum 58 can be represented by the following formula (1)

$$d = K\lambda / \sin(\theta 3/2) \quad (1)$$

wherein K is a constant, and λ is the wavelength of the laser light.

Where the distances between the hologram disc 56, the hologram lens 57, and the photosensitive drum 58 are set to fixed values, the convergent angle θ1 is determined as a fixed value in correspondence with a spot diameter d desired to be obtained. When the convergent angle θ1 is fixed, a cylindrical lens having a longer focal length can receive a larger amount of the collimated laser beam L1. In more concrete terms, as shown in FIG. 10, the cylindrical lens 63, indicated by solid line and having a focal length longer than that of a cylindrical lens 63a indicated by dashed line, can be positioned further away from the hologram disc 56 than the cylindrical lens 63a. Accordingly, the cylindrical lens 63 can receive a collimated beam L1 with a beam diameter larger than that of a collimated light beam L1 that the cylindrical lens 63a can receive. Thus, the cylindrical lens 63 can introduce the laser light more efficiently than the cylindrical lens 63a to the hologram disc 56.

Thus, according to the present embodiment, by using the cylindrical lens 63 with a long focal length that is longer than the diameter of the hologram disc 56, not only can the optical beam scanning device 51 be made to a thin shape as described above but also light can be more efficiently used. It is noted that the slit 62 is preferably formed to a size capable of introducing a collimated beam L1 with a properly large diameter to the cylindrical lens 63.

Because the collimated beam L1 is introduced to the cylindrical lens 63 with high efficiency, a large amount of incident beam L2 can be introduced to the hologram facet 55. Even when the hologram facet 55 diffracts with only a poor diffraction efficiency, the hologram facet 55 can produce a sufficient amount of diffracted laser beam L3 from this large amount of incident beam L2. Accordingly, the optical beam scanning device 51 can employ a hologram disc with a low diffraction efficiency. For example, the device 51 can employ a hologram disc having hologram facets constructed from shallow reliefs. Especially, the hologram disc formed with the reliefs having a depth smaller than the pitch or a half of the pitch of the reliefs can be produced by an injection molding process with high productivity. Such a hologram disc can be mass produced by less expensively. Using the hologram disc 56 with shallow reliefs allows producing the optical beam scanning device 51 much less expensively.

FIGS. 11 to 15 show various modifications of the optical beam scanning device 51 of the present embodiment.

Figure 11:
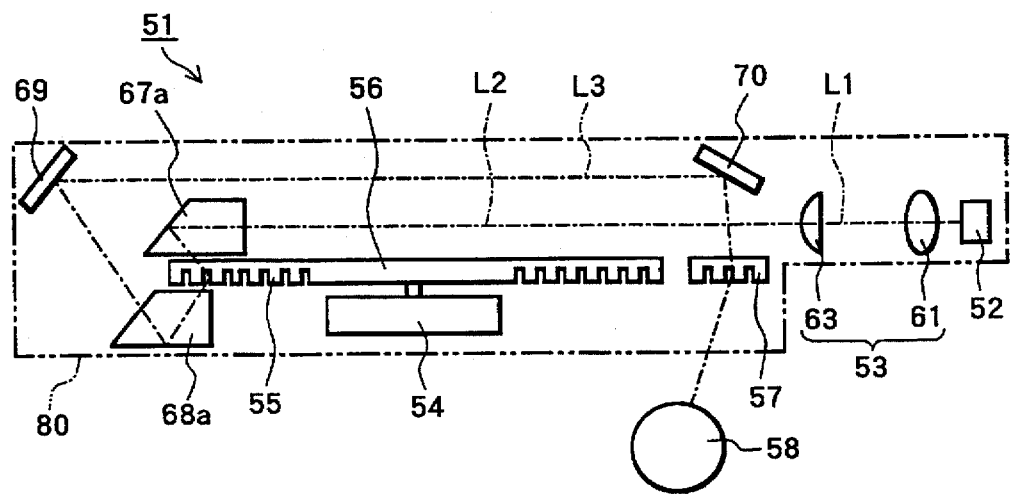
FIG. 11 is a side view showing a modification of the second embodiment.

In the modification shown in FIG. 11, the optical system 53 does not include a slit 62. Prisms 67a and 68a are used in place of the reflection mirrors 67 and 68. As can be seen in FIG. 11, the prism 67a is positioned so that the surface from which laser light is outputted toward the hologram disc 56 is parallel to the surface of the hologram disc 56. With this positioning, the prism 67a can reduce influence of aberrations which occur when a laser beam falls incident on the hologram surface at a slanted angle of incidence.

The hologram lens 57 need not be disposed to the rear of the reflection mirror 70 in the optical path. As long as the hologram lens 57 is disposed in the optical path of the diffracted laser beam L3, the hologram lens 57 can be positioned at any appropriate position with regards to the hologram patterns 55 formed on the hologram disc 56 and the hologram patterns formed on the hologram lens 57.

Figure 12:
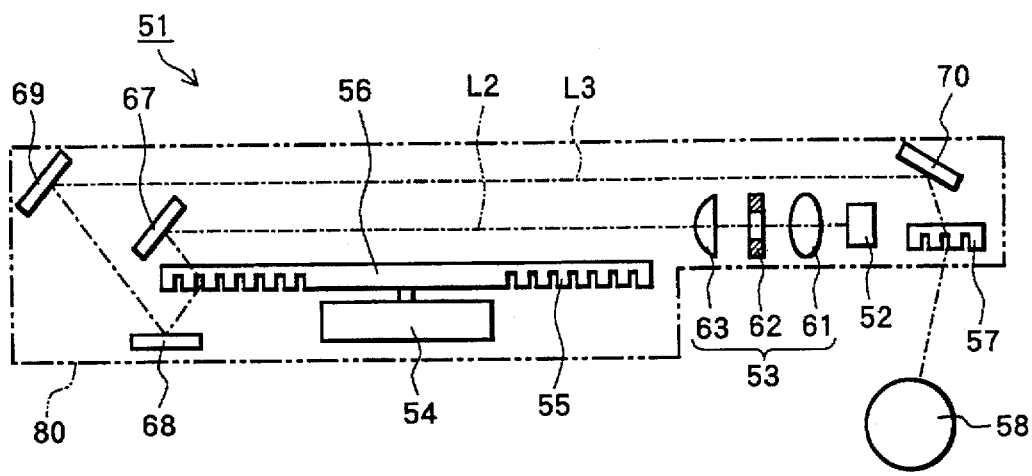
FIG. 12 is a side view showing another modification of the second embodiment.

As shown in FIG. 12, the hologram lens 57 may be disposed in a corner of the case 80 behind the optical system 53.

Figure 13:
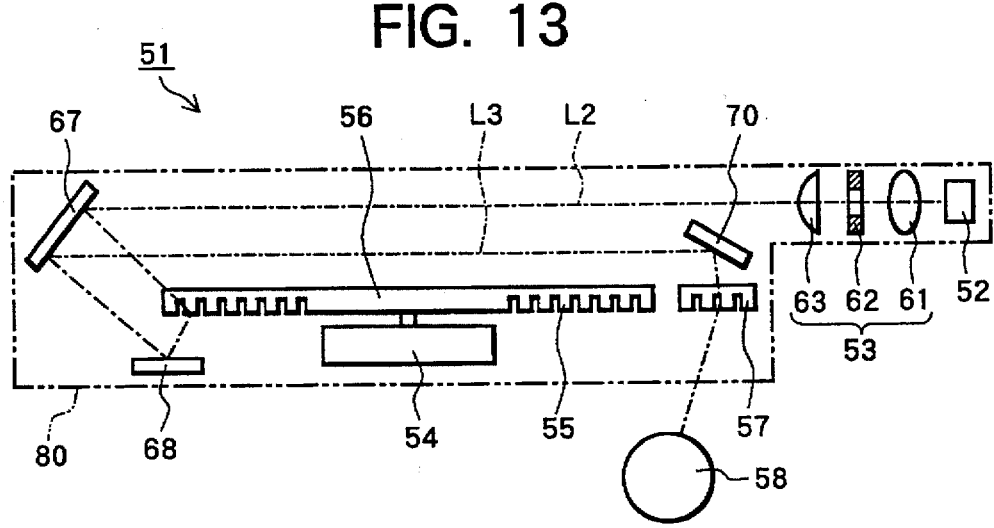
FIG. 13 is a side view showing still another modification of the second embodiment.

Any configuration for components relevant to alignment of optical axes of the incident beam L2 and the diffracted beam L3 is exceptable, as long as the optical scanning device can be built in a thin shape. For example, as shown in FIG. 13, the optical axis of the incident beam L2 can be aligned above the optical axis of the diffracted beam L3. To achieve this, a single reflection mirror 67 can be used to reflect both the incident beam L2 and the diffracted beam L3. This allows reducing the number of components used to build the optical scanning device 51.

Figure 14:
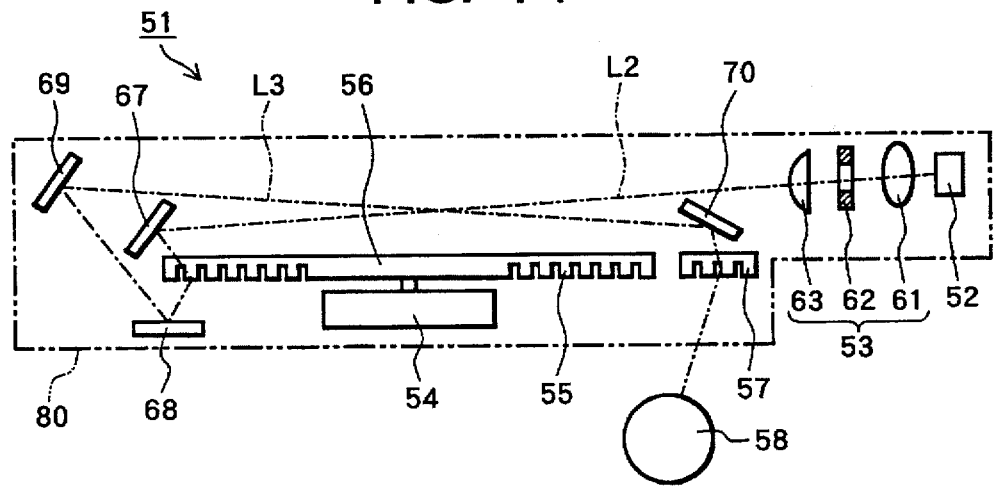
FIG. 14 is a side view showing another modification of the second embodiment.
Figure 15:
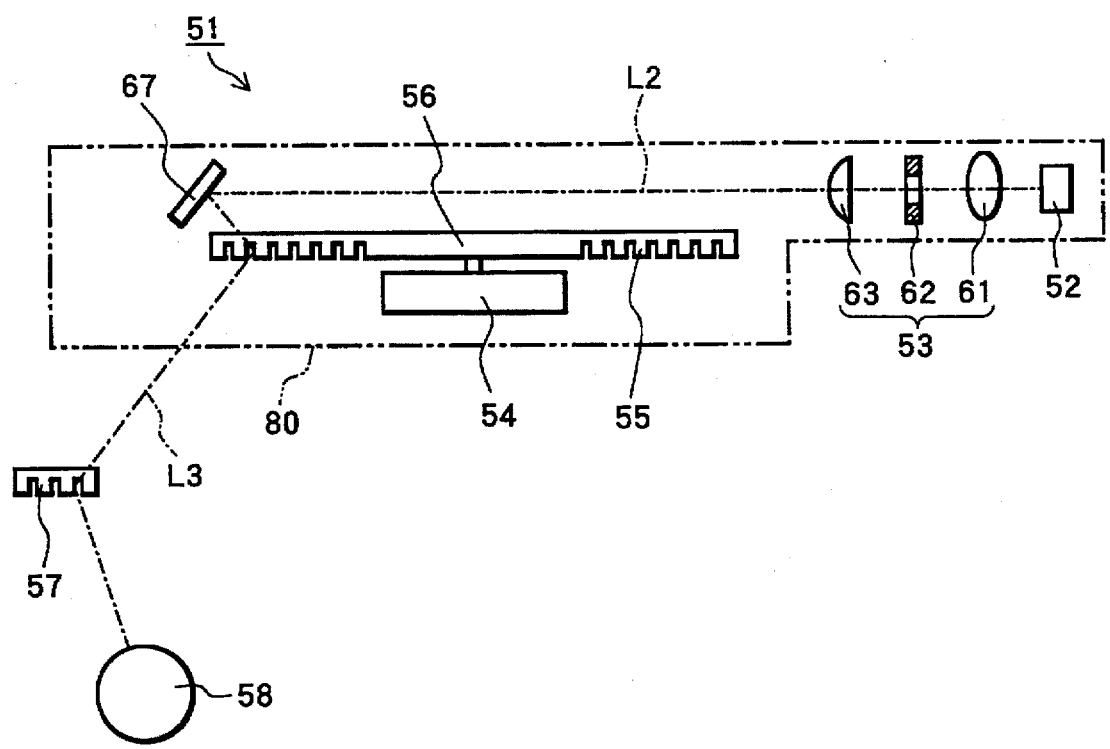
FIG. 15 is a side view showing a further modification of the second embodiment.

As shown in FIG. 14, the optical axes of the incident beam L2 and the diffracted beam L3 can be positioned aligned at an angle to the surface of the hologram disc 56. As shown in FIG. 15, the hologram lens 57 can be positioned outside of the case 80. In this case, the diffracted beam L3 is emitted as is from the case 80 before being converged by the hologram lens 57 onto the photosensitive drum 58. This allows building the case 80 in a thinner shape.

In the above description, the hologram patterns of the hologram facet 55 and the hologram lens 57 cooperate to finally produce a beam spot from the incident beam L2 which is convergent in the cross-scan direction but which is parallel in the in-scan direction. However, other hologram patterns can be selected that produce a beam spot from another laser beam L2 which is convergent in the cross-scan direction and which is also convergent or divergent in the in-scan direction. In this case, the hologram pattern of the hologram facet 55 is designed to have a converging function in the in-scan direction. The hologram facet 55 therefore converts the beam L2 converged in the in-scan direction into a diffracted beam L3 that is collimated in the in-scan direction. Thus, the obtained beam L3 is collimated in the in-scan direction but divergent in the cross-scan direction, similarly to the above description. The hologram lens then converts the diffracted beam L3 into a beam spot, similarly to the above description. It is noted that in order to make a laser beam L2 which is convergent or divergent in the in-scan direction, the distance between the semiconductor laser 52 and the collimator lens 61 may be changed. Or otherwise, a cylindrical lens that has converging power in the in-scan direction can be additionally provided in the optical system 53. A front hologram can be provided to fill the function of the cylindrical lens 63 or the functions of both the cylindrical lens 63 and the collimator lens 61.

As described above, in the optical beam scanning device of the present embodiment, the optical system for converging an incident laser beam has a long focal length. Because the optical system is positioned far away from the hologram disc, the optical system can receive an incident beam with a large beam diameter so as to efficiently use light for scanning operation.

Especially, the optical system has a focal length longer than the diameter of the hologram disc. Accordingly, the optical system can be positioned on the opposite side of the center of the hologram disc with regard to the position where the laser beam falls incident on the hologram disc in focus. This also contributes to reduction in the overall size of the device.

In the optical beam scanning device according to the present embodiment, the optical system is positioned on the opposite side of the center of the hologram disc in regards to the incident position at which incident laser light falls incident to the hologram disc. The optical axis of laser light extending from the optical system to the incidence on the hologram disc can be aligned very close to the surface of the hologram disc. The optical axis is positioned almost virtually parallel with the radial direction of the hologram disc. Therefore, the space required to house the hologram disc is sufficient also for housing the laser light from the optical system to the point of incidence on the hologram disc. No further space is required for positioning the optical axis so that the device can be made in a compact and small size.

The light diffracted at the hologram disc is converged at different powers by the hologram lens with regard to the in-scan direction and the cross-scan direction. This allows forming a small spot having a desired light amount aligned with a predetermined scanning line.

The hologram disc 56 is mounted on the motor 54 with its hologram pattern-formed surface facing downward. It is therefore possible to prevent dust from collecting on the hologram pattern, thereby maintaining a reliable good optical scanning operation.

While the invention has been described in detail with reference to specific embodiments thereof, it would be apparent to those skilled in the art that various changes and modifications may be made therein without departing from the spirit of the invention.

In the embodiments, the hologram patterns are formed from reliefs directly formed on the base of the hologram disc. However, the reliefs could be formed from a resin layer formed on a top of the base of the hologram disc. Some examples of resins from which the reliefs could be formed are photoresist, thermal plastic resin, or resin hardened by ultraviolet light.

The hologram patterns of the hologram disc and of the hologram lens need not be constructed from reliefs formed on the surface of the base. For example, instead of an uneven surface of a relief, the hologram patterns could be formed from differences in light transmission, that is, could be formed from light-obstructing areas and light-transmitting areas. Also, the hologram patterns could be formed from a volume hologram in which phases of the material of the bases are changed.

The laser source is not limited to a semiconductor laser, but could instead be a gas laser or a solid laser. Also, a secondary higher harmonic waves emitted from those lasers could be used for scanning.

What is claimed is:

1. An optical beam scanning device including one rotatable hologram disc which is rotatable about a center thereof, the device comprising:

a laser unit emitting a laser beam;

a hologram disc rotatable about its center and having a surface for diffracting the laser beam, the hologram disc being positioned relative to the laser unit so that the laser beam emitted from the laser unit travels substantially parallel to the surface of the hologram;

incidence control means for causing the laser beam emitted from the laser unit to fall incident on the hologram disc;

a motor for rotating the hologram disc about its center, the hologram disc having a hologram pattern for diffracting the laser beam in a diffraction direction, the hologram pattern being for changing the diffraction direction in an in-scan direction as the hologram disc rotates;

the laser unit being disposed relative to the hologram disc so that the laser beam emitted from the laser unit travels above the hologram disc, the incidence control means causing the laser beam to fall incident on an upper surface of the hologram disc so that the laser beam passes through the hologram disc from its upper surface toward its lower surface and is diffracted thereby;

reflection means for reflecting the laser beam outputted from the lower surface of the hologram disc so as to guide the laser beam past an outer edge of the hologram disc upwardly;

guide means for guiding the laser beam reflected from the reflection means so that the laser beam travels above the hologram disc before outputting toward a medium to scan;

the hologram disc being formed with said hologram pattern for diffracting the incident laser beam on its lower surface, the hologram disc being mounted on the motor with the lower surface formed with the hologram pattern facing downwardly;

the in-scan direction, in which the diffraction direction changes as the hologram disc rotates, extends along a tangential direction of the hologram disc;

the laser unit includes:

a laser source for emitting a laser beam; and beam converting means for converting the laser beam into a laser beam that is converged, at least in a cross-scan direction that is perpendicular to the in-scan direction, to be focused onto the hologram disc;

a focal length, by which the beam converting means focuses the laser beam onto the hologram disc in the cross-scan direction, is longer than the diameter of the hologram disc;

the beam converting means being disposed at one side of the center of the hologram disc so that the laser beam outputted from the beam converting means travels from the one side of the hologram disc toward the other side of the hologram disc, and wherein the incidence control means is disposed at the other side of the center of the hologram disc to cause the laser beam to fall incident on the hologram disc.

2. An optical beam scanning device as claimed in claim 1, wherein the hologram disc includes a diffraction region for diffracting the incident laser beam and a transmission region for transmitting the laser beam therethrough, and wherein the incidence control means guides the laser beam emitted from the laser unit to pass through the transmission region before falling incident on the diffraction region.

3. An optical beam scanning device as claimed in claim 2, wherein the incidence control means includes:

first beam guiding means for causing the laser beam emitted from the laser unit to pass through the transmission region; and second beam guiding means for causing the laser beam that has passed through the transmission region to fall incident on the diffraction region substantially at a predetermined angle of incidence.

4. An optical beam scanning device as claimed in claim 3, wherein the transmission region has a transmission rate for the laser beam that gradually changes across the transmission region.

5. An optical beam scanning device as claimed in claim 1, wherein the incidence control means includes a reflection hologram for diffracting the laser beam emitted from the laser unit and for directing the diffracted laser beam toward the hologram disc.

6. An optical beam scanning device as claimed in claim 1, wherein the laser unit includes:

a laser source for emitting a laser beam; and beam converting means for converting the laser beam into a collimated laser beam.

7. An optical beam scanning device as claimed in claim 1, wherein the laser unit includes:

a laser source for emitting a laser beam; and beam converging means for converging the laser beam into a convergent laser beam converged onto a medium to be scanned by the laser beam.

8. An optical beam scanning device as claimed in claim 1, wherein the incidence control means causes the laser beam to fall incident on the hologram disc substantially at a predetermined angle of incidence.

9. An optical beam scanning device as claimed in claim 1, wherein the reflection means has a reflection rate for the laser beam that changes gradually from its center toward its edge portions.

10. An optical beam scanning device as claimed in claim 1, wherein the incidence control means includes a reflection mirror for reflecting off the laser beam outputted from the beam converting means to cause the laser beam to fall incident on the hologram disc.

11. An optical beam scanning device as claimed in claim 1, wherein the incidence control means includes a prism for reflecting off the laser beam outputted from the beam converting means to cause the laser beam to fall incident on the hologram disc.

12. An optical beam scanning device as claimed in claim 1, wherein the beam converting means includes a cylindrical lens.

13. An optical beam scanning device as claimed in claim 1, wherein the beam converting means converts the laser beam into a laser beam that is converged in the cross-scan direction and that is substantially collimated in a direction parallel to the in-scan direction.

14. An optical beam scanning device as claimed in claim 1, further comprising a hologram lens for converging the laser beam diffracted by the hologram disc into a beam spot for scanning a medium to be scanned, the hologram lens having different powers in converging the laser beam in the cross-scan and in-scan directions.

15. An optical beam scanning device comprising:

a laser source emitting laser light;

a rotatable circular hologram disc having a diameter, the hologram disc diffracting the laser light from the laser source to scan a subject medium in an in-scan direction, the hologram disc having a hologram pattern on its lower surface for diffracting the incident laser beam;

an optical system disposed to irradiate the hologram disc with laser light emitted from the laser source and converging the laser light in a cross-scan direction perpendicular to the in-scan direction to converge at a focal point on the hologram disc, the optical system having a focal length longer than the diameter of the hologram disc, the optical system being disposed relative to the hologram disc so that the laser beam emitted from the optical system travels above the hologram disc substantially parallel to an upper surface of the hologram disc;

an incidence member disposed to cause laser light from the optical system to fall incident on the hologram disc at a position of incidence, the optical system being located on one side of a center of the hologram disc and the position of incidence being located on an opposite side of the center of the hologram disc, the incidence member causing the laser beam to fall incident on the upper surface of the hologram disc so that the laser beam passes through the hologram disc from its upper surface toward its lower surface and is diffracted thereby;

reflection means for reflecting the laser beam outputted from the lower surface of the hologram disc so as to guide the laser beam past an outer edge of the hologram disc upwardly; and guide means for guiding the laser beam reflected from the reflection means so that the laser beam travels above the hologram disc before outputting toward a medium to scan.

16. An optical beam scanning device comprising:

a laser source emitting laser light;

a rotatable circular hologram disc for diffracting the laser light from the laser source, the hologram disc having one surface formed with a hologram pattern for diffracting the laser light;

driving means for rotationally driving the circular hologram disc to change the diffraction direction, in which the hologram disc diffracts the laser light, thereby scanning a subject medium with the laser light in an in-scan direction, the hologram disc being mounted on the driving means with the surface formed with the hologram pattern facing downwardly;

an optical system for directing the laser light from the laser source onto an upper surface of the hologram disc so that the laser light passes the hologram disc from the upper surface to its lower surface whereby the laser light is diffracted, the optical system including a laser unit and an incidence member, the laser unit guiding the laser light from the laser source to the incidence member while converging the laser light in a cross-scan direction perpendicular to the in-scan direction to converge at a focal point on the hologram disc, the laser unit having a focal length longer than the diameter of the hologram disc, the incidence member being disposed to cause the laser light from the laser unit to fall incident on the hologram disc at a position of incidence, the laser unit being located on one side of a center of the hologram disc and the incidence member being located on an opposite side of the center of the hologram disc so that the laser light travels from the laser unit to the incidence member substantially parallel to the upper surface of the hologram disc; and reflection means for reflecting the laser light, which has been diffracted by the hologram disc and which has been outputted from the lower surface of the hologram disc, upwardly past an outer edge of the hologram disc.

17. An optical beam scanning device as claimed in claim 16, further comprising a laser beam converging means for converging the laser beam diffracted by the hologram disc into a beam spot for scanning a medium to be scanned.

* * * * *